G. B. De BOUCHERVILLE.
Propulsion of Vehicles.

No. 158,363. Patented Jan. 5, 1875.

Witnesses,

Inventor,
George Boucher de Boucherville

UNITED STATES PATENT OFFICE.

GEORGE BOUCHER DE BOUCHERVILLE, OF QUEBEC, CANADA.

IMPROVEMENT IN PROPULSION OF VEHICLES.

Specification forming part of Letters Patent No. 158,363, dated January 5, 1875; application filed December 6, 1873.

*To all whom it may concern:*

Be it known that I, GEORGE BOUCHER DE BOUCHERVILLE, of the city and Province of Quebec, in the Dominion of Canada, have invented certain new and useful Improvements in a Method for the Propulsion of Vehicles; and I do hereby declare the following to be a full, clear, and exact description of the invention, such as will enable others skilled in the art to which it pertains to make and use it, reference being had to the accompanying drawings, which form part of this specification.

My invention relates to a mechanism for the propulsion of vehicles.

Figure 1:
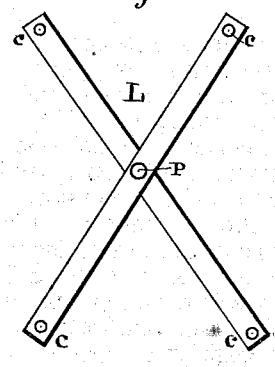
Figure 2:
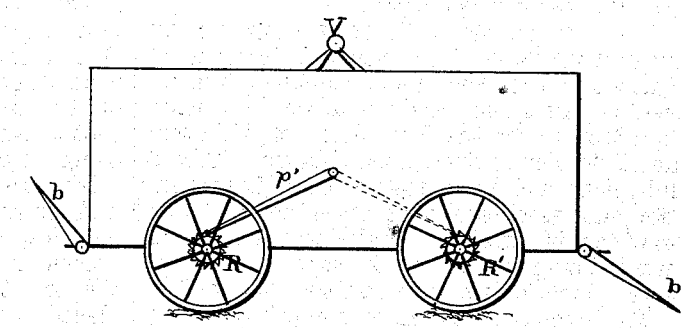
Figure 3:
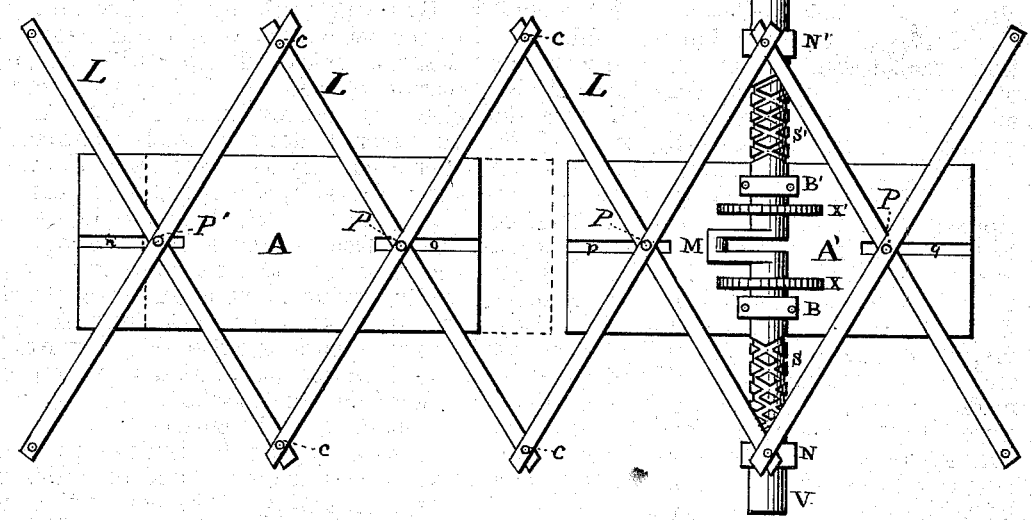

In the drawings, Figure 1 represents a section of "lazy-tongs," as employed in my invention; Fig. 2, a side elevation of my invention; Fig. 3, a plan view of the same.

My invention consists in the various parts and combinations, as hereinafter specified and claimed, wherein—

A A' are two cars, wagons, or other vehicles, to which is journaled at B B' the shaft V. This shaft is provided at its middle portion with the crank M, and upon either side of the crank M with the cog-wheels X X', and beyond the cog-wheels X X' with the double-threaded reciprocating screws S S'. Upon the reciprocating threads S S' move the nuts N N', which are made to travel in a reciprocating manner, and in directions opposed to each other, by the action of the reciprocating screws S and S'. To the nuts N N' are fixed the arms of my propeller, which is made in the form commonly designated as "lazy-tongs", composed of the arms L, joined at P and $c$ in the usual manner. The pivots P are made to extend through the arms L downward into the slots $n$ $o$ $p$ $q$ upon the cars A A', and so constructed that when desired they may be fixed stationary in any of said slots. Upon the axles of the running-gear are fixed the ratchets R R', operating in opposite directions to each other, and engaging with a suitable pawl, $p'$, fixed to the body of the car or vehicle. Upon each end of the car or vehicle A are hinged the stops $b$ $b'$. Power is applied to the shaft V by operating the crank M, or by a suitable gear-connection to the wheels X X'. By the revolution of the shaft V the reciprocating screws S S' will operate in an obvious manner to move the nuts N N' in a reciprocating manner, and so that they shall alternately approach and recede from each other, carrying with them the two arms of the accelerator L, which are attached to them, resulting in alternately shortening and elongating the said accelerator.

My propeller is made of sufficient length and dimensions to connect over two or more vehicles, A A'. As it is desired to move the vehicle in one direction or another the stops $b$ $b'$ and the pawl and ratchets $p'$ R R' are placed in a position to operate so as to prevent any back motion of the vehicle by the locking of one set of wheels or the operation of the stops $b$ or $b'$ upon the ground, as will be obvious. The power-shaft V may be fixed upon each vehicle as upon the one A', and when thus fixed it is apparent that the same effect is accomplished as by fixing stationary the forward pivot, P', upon a vehicle not provided with the power-shaft V.

By fixing stationary the forward pivot, P', to the vehicle beneath, it will clearly appear that the vehicle will move with the pivot P', instead of said pivot P' moving idly in its slot. By the revolution of the shaft V the lazy-tongs L are alternately lengthened and shortened. By the operation of the fixed pivots, and also by the operation of the devices P', R, and $b'$, or $p'$, R', and $b$, the car is prevented from taking a back motion, and the accelerator, in its extension, acts to propel the leading vehicle, while in its contraction it will draw the rear vehicle, inasmuch as back motion in both or either of the trucks is prevented by the pawl-and-ratchet stop device, as hereinbefore described.

I claim as my invention—

1. As a propeller for vehicles, the combination of lazy-tongs L P and operating mechanism consisting of the double-threaded reciprocating screws S S' and nuts N N', all to operate substantially as and for the purposes described.

2. The combination of the vehicle or truck A', shaft V, reciprocating screw S S', nuts N N', lazy-tongs L P $c$, and vehicle or truck A, substantially as and for the purposes set forth.

3. In combination with the truck A A', lazy-tongs L P, and operating-screw S S′, the stops $b\, b'$, placed at both ends of the truck, substantially as and for the purposes described.

4. In combination with the trucks A A′, the lazy-tongs L P and operating mechanism S S′, the pawl and ratchet R R′ upon the axle of the running-gear, substantially as and for the purposes described.

5. The combination of the vehicle A A′, lazy-tongs L P c, nuts N N′, and reciprocating screws S S′ upon the shaft V, with suitable power for revolving the shaft V, the pawl and ratchets $p'$ R R′, and stops $b\, b'$, constructed, united, and adapted to operate substantially as herein set forth.

GEORGE BOUCHER DE BOUCHERVILLE.

Witnesses:
   ILI JODOIN,
   ANTOINE A. LABELLE.